United States Patent
Fleissner

[15] 3,696,475
[45] Oct. 10, 1972

[54] PROCESS AND APPARATUS FOR TENTERING AND HEATING TEXTILE MATERIALS

[72] Inventor: Heinz Fleissner, Egelsbach near Frankfurt am Main, Germany

[73] Assignee: VEPA AG

[22] Filed: Nov. 21, 1969

[21] Appl. No.: 877,566

Related U.S. Application Data

[60] Division of Ser. No. 831,683, June 9, 1968, Pat. No. 3,521,378, which is a continuation-in-part of Ser. No. 654,728, July 20, 1967, Pat. No. 3,503,134.

[30] Foreign Application Priority Data

| June 8, 1968 | Germany | P 17 60 604.1 |
| June 22, 1968 | Germany | P 17 60 717.9 |
| June 27, 1968 | Germany | P 17 60 751.1 |
| April 8, 1969 | Germany | P 19 17 757.2 |

[52] U.S. Cl. ............26/60, 26/51.3, 26/52, 34/115
[51] Int. Cl. ...........................D06c 3/02
[58] Field of Search .....34/115, 117; 26/18.5, 57, 52, 26/60, 61 A, 62 A, 68

[56] References Cited

UNITED STATES PATENTS

| 380,139 | 3/1888 | Scholfield | 26/60 |
| 2,219,213 | 10/1940 | Swain | 26/60 X |
| 2,450,022 | 9/1948 | Schreiner | 26/52 X |
| 2,618,012 | 11/1952 | Milne | 26/57 UX |
| 3,235,931 | 2/1966 | Bruckner | 26/60 X |
| 3,380,175 | 4/1968 | Fleissner et al. | 34/115 |
| 3,503,134 | 3/1970 | Fleissner | 26/60 X |

FOREIGN PATENTS OR APPLICATIONS

| 90,046 | 1/1897 | Germany | 26/57 |
| 506,148 | 5/1939 | Great Britain | 26/57 |
| 942,578 | 11/1963 | Great Britain | 34/115 |

*Primary Examiner*—Robert R. Mackey
*Attorney*—Craig, Antonelli and Hill

[57] ABSTRACT

The present disclosure is directed to an apparatus for the treatment of materials which comprises a heat-insulated treatment chamber, a plurality of sieve drum means subjected to a suction draft rotatably disposed within said treatment chamber, fan means associated with the sieve drum means for producing a suction draft and for circulating the treatment medium in said treatment chamber, heating means provided in the circulation zone of the treatment medium, tentering means containing tensioning chains at least partially disposed outside of the treatment chamber as inlet means, said tentering means cooperating with the sieve drum means for the effective conveyance of the material being treated to said sieve drum means, a supporting means disposed below the tensioning chains for supporting the material disposed on said chains so that the material is conveyed on the underside of the chains, and outlet means for removing the material being treated from the treatment chamber.

13 Claims, 5 Drawing Figures

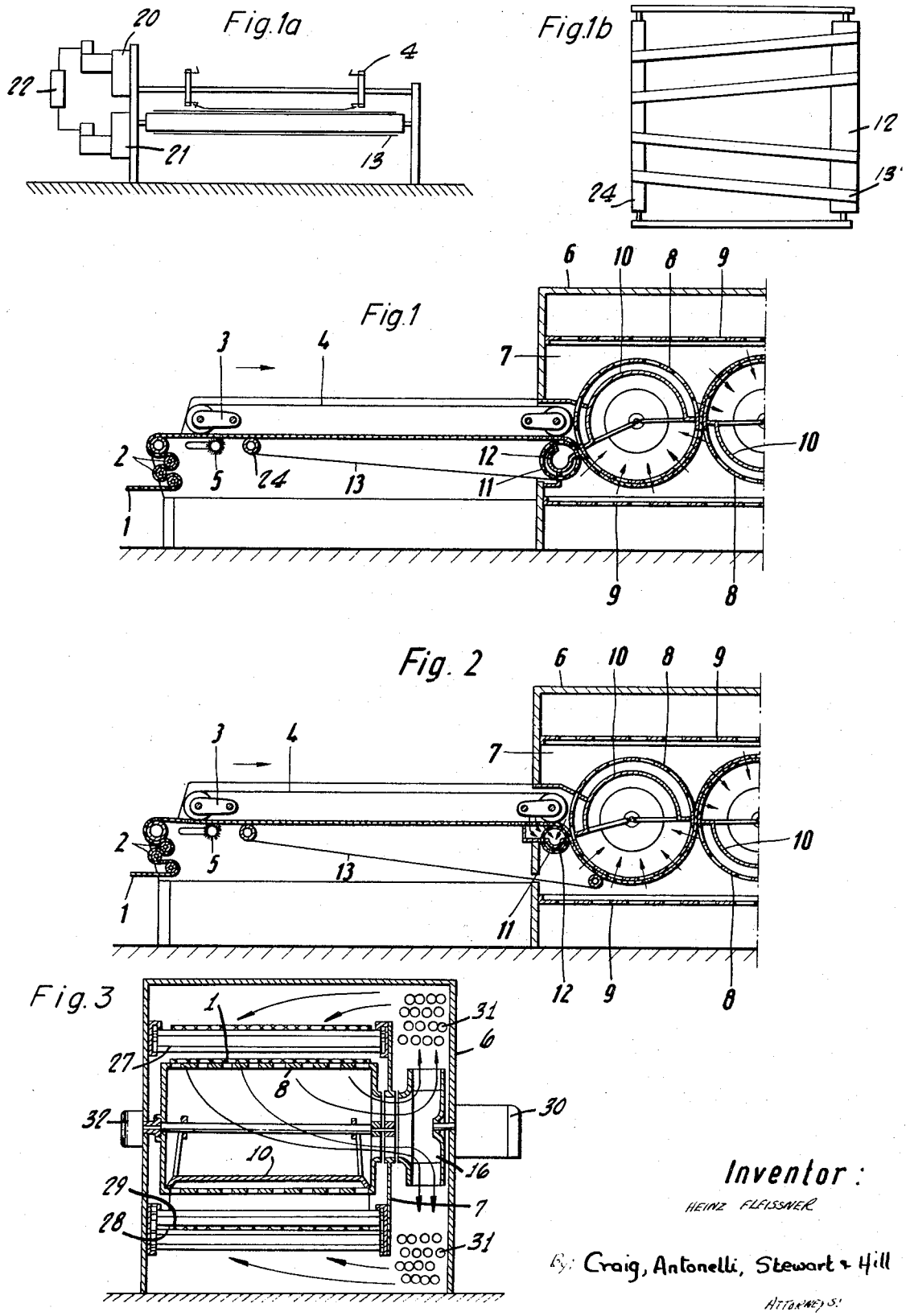

PROCESS AND APPARATUS FOR TENTERING AND HEATING TEXTILE MATERIALS

BACKGROUND OF THE INVENTION

This application is a division of application Ser. No. 831,683, filed on June 9, 1968 (now U.S. Pat. No. 3,521,378), which application is a continuation-in-part application of application Ser. No. 654,728, filed on July 20, 1967 (now U.S. Pat. No. 3,503,134).

The present invention relates to a process and apparatus for the treatment, e.g., drying, steaming, fixing, condensing and the like, of materials, particularly textile materials, such as cloth, knit fabrics, composite fiber materials, tufted goods, etc., by utilizing a gaseous treatment medium, for example, air, steam, or steam-air mixtures. The apparatus of the present invention includes a heat-insulated housing containing as the conveying means at least one sieve means subjected to a suction draft preferably a perforated sieve drum means, and one or more fan means for the generation of said suction draft and for the purposes of circulating the treatment medium. A heating means is also provided for heating the treatment medium.

It is known to combine devices of this type with a tentering device in such a manner that the material is guided, while being stretched along its width, directly up to the placement or transfer of said material to the conveying means subjected to a suction draft. Such a guidance of the material preliminary to its introduction onto a conveying means subjected to a suction draft exhibits the advantage that the width of the wide-stretched material is substantially retained by the suction draft and thus is prevented from shrinking.

The utilization of the throughflow principle and the conveyance on perforated sieve conveying means during the treatment affords considerable advantages as compared to a sole tenter frame treatment. The particular advantages of the throughflow principle include extremely brief treatment times and an extremely uniform treatment effect. By placing the material on sieve means during the treatment process, a more uniform character of the materials is obtained particularly in the case of fixing treatments and generally in the case of treating mesh material. By the utilization of a tentering station, the material can be prestretched to a specific width. Furthermore, creases can also be substantially eliminated.

One of the problems encountered in the use of tentering devices is that the material sags between the tentering chains. This can promote the formation of arcs in case of treating very wide webs of material tending toward arc formation. Also, the tensile forces are correspondingly high when treating wet textile material, especially in the case of thick goods such as tufted rugs and stitched felts. In the case of wide webs of material, it is very difficult to fully eliminate oblique distortion and arcs solely by the chains of the tenter station, that is, by temporarily having one chain lead or lag behind with respect to the other chain. Also, in the case of sensitive knit fabric webs having a width of about 3 meters and more, a sagging of the material is disadvantageous since as a result, the loops or stitches in the marginal zones are stretched out of shape more readily and to a greater degree than those in the central zone.

In connection with tentering stations, it is conventional to dispose cords or pipes between the the tentering chains, on which elements the material rests and thus is prevented from sagging. However, such an arrangement of stationary supporting units is undesirable since the material slides along these stationary elements and thus is braked. The disadvantage of arc formation as a consequence of structural changes in the marginal zone also occurs in this arrangement and even to an increased extent.

In order to eliminate creases, and in order to stretch the material to a specific width, a certain length of the tentering station is required, for example, at least about 4 meters or more. The longer the tentering station, the more favorably affected is the material. However, lengthening the tentering station is expensive and in addition produces the disadvantage that the space requirements become correspondingly larger. In general, only a limited space is available for such treatment plants. Therefore, it is desired to keep the plant as short in length as possible. By employing the perforated drum principle, a shortening of the treatment time and thus also a shortening of the length of the treatment plant can be achieved.

SUMMARY OF THE INVENTION

The object of the present invention is to avoid the prior art disadvantages in the treatment of textile materials.

Another object of the present invention is to provide an improved process for the treatment of textile materials wherein the material being treated is guided through the treatment process and apparatus in a distortion-free manner.

A further object of the present invention is to provide an improved process and apparatus for the treatment of textile materials wherein a substantial reduction in apparatus cost and space can be achieved thereby making the present system economically advantageous.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Pursuant to the present invention, it has been found that the above-mentioned disadvantages may be eliminated and a much improved process and apparatus for the treatment of textile materials may be obtained by providing at least one endless supporting element associated with the tentering device, which travels along with said tentering device. The supporting elements, according to one embodiment of the present invention, can consist of cords or strings (bands or belt) spaced at mutual distances from each other. In this connection, it is advantageous to arrange the cords and strings on the side carrying the material, and at a slight angle with respect to each other in the direction of travel, in such a manner that the strings preferably diverge from one another, as seen in the direction of travel. Another desirable arrangement results by disposing a broad supporting band between the tentering chains. In this connection, the supporting band (belt) is arranged at the level of the tentering plane or slightly therebelow.

The tentering chains are disposed above the supporting element thereby guiding the web of material along the underside of said tentering chains. This arrangement exhibits the particular advantage that the supporting element, for example, the supporting band, can be provided wider that the tentering width, so that the entire width of the material can rest on the supporting element. In order to remove the web of material from the needles (pins) of the tentering chains, a conventional perforated roll, which is under a suction draft, can be employed. This ensures that the material is unequivocally held by a suction draft along its peripheral edges, even along the path between the transfer area and the conveyance onto the perforated drum.

The provision of using a supporting element between the tentering chains exhibits the additional advantage that said element can temporarily be driven faster or more slowly by the interposition of an appropriate gear, and thus can be employed to compensate for arc distortions in the material.

The use of a supporting element, particularly a band-shaped supporting element, makes it additionally possible, according to the present invention, to utilize the apparatus in a substantially more versatile manner. Apparatus with versatile application is of great importance, particularly with small companies and in the case of contractors, since in such cases, due to the large capacity of the perforated drum devices, all existing types of materials can be treated thereon.

BRIEF DESCRIPTION OF THE DRAWINGS

The present invention will become more fully understood from the detailed description given hereinbelow on the accompanying drawings which are given by way of illustration only and thus are not limitative of the present invention and therein:

FIG. 1 shows a perforated sieve drum device in a longitudinal sectional view provided with a tentering station disposed in front of said device;

FIG. 1a shows an end view of the device shown in FIG. 1;

FIG. 1b shows a plan view of a support means operatively associated with the tentering means illustrated in FIG. 1;

FIG. 2 shows another embodiment of the device shown in FIG. 1; and

FIG. 3 shows a cross-sectional view through the device of FIG. 1.

DESCRIPTION OF THE PREFERRED EMBODIMENTS

Referring now the drawings wherein like reference numerals are used throughout the various views to designate like parts the apparatus according to FIG. 1 comprises a web-shaped material 1 which is conducted over rollers 2 and spread during said process. Subsequently, the material is transferred to a tentering station 3 and taken over by the tentering chains 4. In the illustrated embodiments, the tentering chains are constructed as pins, spikes or needle chains having a vertical chain return system. However, it is also possible to employ tentering chains having a horizontal chain return. The material 1 is attached to the pins in a conventional manner by means of circular brushes (brush disks) 5. The apparatus includes a heat-insulated housing 6 subdivided by a longitudinal wall 7 into a treatment chamber and a fan chamber, which is customary in perforated sieve drum dryers. Perforated drums 8, which are subjected to a suction draft are disposed in the treatment chamber. In the fan chamber, the fans are accommodated, said fans being required for the production of the suction draft. These fans blow the treatment medium drawn from the perforated drums 8, via heating units above and below the perforated drums back into the treatment chamber. The longitudinal wall 7 accordingly extends only up to the perforated covers 9 disposed above and beneath the perforated drums for making the flow uniform. ON the side which is free of the material being treated, the perforated drum contains a cover or baffle member 10 which interrupts the suction draft at this side of the sieve drum.

A suction roll 11 is disposed at the inlet of the housing 6 in order to transfer the material from the tentering chains 4 to the first perforated drum 8. This roll, too, is shielded from the suction draft on the side free from contact with the material being treated by means of a cover plate 12.

In the apparatus according to FIGS. 1 and 2, the material 1 is guided on the underside of the tentering chains 4 by a conveyor belt 13 which is associated with the tentering chains. Thus, the material being treated rests on this conveyor belt. The conveyor belt in these embodiments extends beyond the maximum stretching width.

The device according to FIG. 2 is similarly constructed to the device of FIG. 1. However, in FIG. 2, the conveyor belt 13 partially extends about the first perforated drum 8, so that for a short distance the material is held between conveyor belt 13 and perforated drum 8 during the heating procedure.

In FIG. 1a there is illustrated the means for driving the conveyor belt at a variable speed in order to compensate for the weft or diagonal distortions which might occur in the textile material. This means includes control unit 20 for regulating the speed of the tensioning chains, control unit 21 for regulating the speed of the conveyor belt, and control unit 22 which correlates the speed of the tensioning chains with the speed of the conveyor belt.

In FIG. 1b the embodiment of the apparatus is illustrated wherein the conveyor belt is in the form of a plurality of spaced-apart bands, which bands diverge from each other in the direction of the material travel. These bands are designated by reference numeral 13'.

The cross section of this device is illustrated in FIG. 3. As can be seen therefrom, the internal space of the heat-insulated housing 6 is subdivided by a wall 7 into a heating chamber and a treatment chamber. Each perforated drum 8 is associated with a radial-flow fan 16, disposed at the front end of the drum. Outlet means in the form of a pair of perforated belts 28 and 29 are shown positioned at the end and below the last of the perforated drums 8 positioned within the treatment chamber. The drive 30 for the fan is attached at the outside of housing 6. Heating units 31 are provided in the fan chamber above and below the fan 16. The drive 32 for the perforated drum 8 is mounted on the other side of the housing.

The invention being thus described, it will be obvious that the same may be varied in many ways. Such variations are not to be regarded as a departure from the spirit and scope of the invention, and all such modifications as would be apparent to one skilled in the art are intended to be included.

It is claimed:

1. An apparatus for the treatment of textile material which comprises a heat-insulated treatment chamber; a plurality of sieve drum means subjected to a suction draft rotatably disposed within said treatment chamber; fan means associated with the sieve drum means for producing a suction draft and for circulating a treatment medium in said treatment chamber; heating means provided in a circulation zone of the treatment chamber; inlet means for introducing a textile material into said treatment chamber, said inlet means including tentering means provided with tensioning chains and at least partially disposed outside the treatment chamber, said tentering means cooperating with the sieve drum means for the effective conveyance of the textile material to said sieve drum means; a supporting means disposed below the tensioning chains for supporting the textile material disposed on said chains whereby the textile material is conveyed on the bottom side of the tensioning chains; a suction roller disposed between the tentering means and the first sieve drum means and below said tentering means at the inlet end of the treatment chamber, said suction roller facilitating the removal of the textile material from the tentering means and transferring the material to the lower portion of said first sieve drum means; and outlet means for removing the textile material from the treatment chamber.

2. The apparatus of claim 1, wherein the suction roller contains a baffle plate which interrupts the flow of the suction draft at that portion of the roller which is not in contact with the material being treated.

3. The apparatus of claim 2, wherein the supporting means is a conveyor belt and the suction roller forms one of the reversing members of said conveyor belt.

4. The apparatus of claim 1, wherein means are provided for driving the supporting means at a variable speed in order to compensate for weft distortions in said textile material.

5. The apparatus of claim 1, wherein the supporting means comprises a plurality of spaced-apart bands associated with the tentering means on the side thereof carrying the textile material.

6. The apparatus of claim 5, wherein the bands diverge from each other, in the direction of material travel.

7. An apparatus for the treatment of textile material which comprises a heat-insulated treatment chamber; a plurality of sieve drum means subjected to a suction draft rotatably disposed within said treatment chamber; fan means associated with the sieve drum means for producing a suction draft and for circulating a treatment medium in said treatment chamber; heating means provided in a circulation zone of the treatment chamber; inlet means for introducing a textile material into said treatment chamber, said inlet means including tentering means provided with tensioning chains and at least partially disposed outside of the treatment chamber, said tentering means cooperating with the sieve drum means for the effective conveyance of the textile material to said sieve drum means; a moving conveyor belt disposed below the tensioning chains and operatively associated with said tensioning chains for supporting the textile material disposed on said chains, said textile material being conveyed on the bottom side of the tensioning chains whereby textile material transfer is facilitated from said chains to the sieve drum means; and outlet means for removing the textile material from said treatment chamber.

8. The apparatus of claim 7, wherein the conveyor belt extends into the treatment chamber beyond the tentering means.

9. The apparatus of claim 8, wherein the conveyor belt is a wire mesh belt which extends at least partially around at least one sieve drum means.

10. The apparatus of claim 7, wherein the width of the conveyor belt extends beyond the maximum stretched width of the textile material.

11. A process for the treatment of textile materials selected from the group consisting of knitted goods, composite fiber materials and tufted goods in a treatment chamber containing a plurality of sieve drum means subjected to a suction draft which comprises introducing a textile material onto a tentering means containing tensioning chains where the material is held by its edges in a stretched condition with pins, supporting the textile material below said tentering means while said material is being conveyed on the bottom side of the tensioning chains, applying a suction draft to said textile material whereby said material is drawn out of the pins of the tensioning chains while being supported, transferring the textile material to the first sieve drum means subjected to a suction draft, and drawing a treatment medium around and through the textile material while the material is being conveyed on the first and subsequent sieve drum means.

12. The process of claim 11, wherein the treatment medium is air, steam or steam-air mixtures.

13. The process of claim 11, wherein the textile material is supported by a moving conveying means which is driven at a speed sufficient to compensate for distortions in the textile material.

* * * * *